(12) United States Patent
Breh et al.

(10) Patent No.: US 8,805,970 B2
(45) Date of Patent: Aug. 12, 2014

(54) AUTOMATIC MANAGEMENT OF CONFIGURATION PARAMETERS AND PARAMETER MANAGEMENT ENGINE

(75) Inventors: Jochen Breh, Boeblingen (DE); Georg Ember, Nuremberg (DE); Walter Haenel, Boeblingnen (DE); Thomas Spatzier, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 463 days.

(21) Appl. No.: 13/276,520

(22) Filed: Oct. 19, 2011

(65) Prior Publication Data

US 2012/0102160 A1 Apr. 26, 2012

(51) Int. Cl.
*G06F 15/173* (2006.01)
*G06F 9/50* (2006.01)

(52) U.S. Cl.
CPC .................... *G06F 9/5061* (2013.01)
USPC .......................... 709/220; 709/221

(58) Field of Classification Search
USPC .................. 709/220, 226, 238; 370/329, 412
See application file for complete search history.

(56) References Cited

U.S. PATENT DOCUMENTS

| | | | | |
|---|---|---|---|---|
| 7,430,261 B2 * | 9/2008 | Forest et al. | ................. | 375/364 |
| 7,519,717 B2 * | 4/2009 | Stanford-Clark et al. | .... | 709/230 |
| 7,586,953 B2 * | 9/2009 | Forest et al. | ................. | 370/503 |
| 7,602,723 B2 * | 10/2009 | Mandato et al. | ............. | 370/236 |
| 8,463,939 B1 * | 6/2013 | Galvin | .......................... | 709/238 |
| 2009/0300341 A1 | 12/2009 | Buehler et al. | | |

OTHER PUBLICATIONS

"Java Configuration Solution", http://www.webcitation.org/5gEglu6RH, printed Jul. 6, 2010, 1 page.
U.S. Appl. No. 13/681,666, Nov. 20, 2012 1 page.

* cited by examiner

*Primary Examiner* — Khanh Dinh
(74) *Attorney, Agent, or Firm* — Francis Lammes; Stephen J. Walder, Jr.; Jeffrey S. LaBaw

(57) ABSTRACT

A mechanism is provided for an automatic management of configuration parameters of computing resources between related computing systems. Services instances of computing systems are generated according to associated configuration parameter sets and respective corresponding configuration parameter values. A determination is made of configuration parameter value changes in the configuration parameter sets for each generated service instance of the computing systems. The configuration parameter value changes for each generated service instance are compared with a first subset configuration parameter values and with a second subset configuration parameter values. The determined configuration parameter value changes in one service instance are then propagated to another service instance according to a definition of rules for mapping configuration parameters and their values between second subsets of configuration parameters.

18 Claims, 5 Drawing Sheets

AUTOMATIC MANAGEMENT OF CONFIGURATION PARAMETERS AND PARAMETER MANAGEMENT ENGINE

BACKGROUND

The invention relates generally to automatic management of configuration parameters as well as to a parameter management engine.

The invention relates further to a computer system, a data processing program, and a computer program product.

In enterprises, IT environments are usually managed and organized in lines or projects. A line or project basically refers to a set of IT systems or IT environments (IT=information technology) for a specific application or functional area like, e.g., customer procurement portal application or a content management and collaboration application, or the hosting of a certain web application, and typically consists of multiple IT environments in different stages, e.g. one or multiple for development of the application, one for testing of the application, one for integration testing of the application and finally one for production use of the application. An IT environment, in particular a service instance in one project should be managed consistently across different computing systems of the different stages according to a service definition in order to ensure that the application developed in one environment also works in the other environments of the project.

In particular, parameters of the environments, i.e., different computing systems per stage, have to be managed in a consistent way.

Current solutions for parameter management of computing systems only work on a single system level, without including policies or rules on a larger scope as in a project. Such solutions may only be used to propagate parameter changes over homogeneous systems, not taking into account the roles of systems in a project. For example, on a project level parameter management, a more structural approach is needed to implement project level and even enterprise level policies for parameter management.

In particular, with the advent of Cloud Computing where composite IT services may be set up rapidly based on templates, known as service definition, parameters must be managed across instances of different Cloud Services that belong to a project, the above mentioned requirement must be met.

Document US 2009/0300341A1 discloses a system and method for automatic configuration of portal composite applications. Configuration parameters are defined within a composite application template. These parameters in turn define the runtime behavior of the composite application within a predetermined range of variability, and each parameter defines a receptive point of variability.

Thus, there may be a need for an improved method and an engine for managing configuration parameters of related computing systems, in particular computing systems that are related due to a common purpose or project.

SUMMARY

This need may be addressed by a method for automatic management of configuration parameters of computing resources between related computing systems in an automatic management server, a parameter management engine, a computer system, a data processing program, and a computer program product according to the independent claims.

In one embodiment, a method for automatic management of configuration parameters of computing resources between related computing systems in an automatic management server may be provided. Each of the computing systems may be configured according to a configuration, in particular, a service configuration, comprising a configuration parameter set with associated configuration parameter values, wherein each of the configuration parameter sets may comprise a first subset of configuration parameters, having first subset configuration parameter values, equal to the first subset configuration parameter values of the other computing systems and, wherein each of the configuration parameter sets may comprise a second subset of configuration parameters, having second subset configuration parameter values, which may be different to the second subset configuration parameter values of the other computing systems. The method may comprise:

storing in a database the configuration parameter sets along with respective configuration parameter values for each of the computing systems, storing in the database the first subset of configuration parameters and respective first subset configuration parameter values, storing in the database the second subset of configuration parameters, storing a definition of rules for changing configuration parameter values in each configuration parameter set, and storing in the database a definition of rules for mapping configuration parameters and their values between second subsets of configuration parameters for the different computing systems, generating service instances of computing systems according to the configuration parameter sets and the corresponding configuration parameter values, determining configuration parameter value changes in the configuration parameter sets for each generated service instance of computing systems, comparing the configuration parameter value changes for each generated service instance with the first subset configuration parameter values and with the second subset configuration parameter values, propagating determined configuration parameter value changes in one service instance to the other service instances according to the rules for mapping configuration parameters between second subsets of configuration parameters.

In another embodiment, a parameter management engine for automatic management of configuration parameters of computing resources between related computing systems in an automatic management server may be provided. Each of the computing systems may be configured according to a configuration, in particular, a service configuration, comprising a configuration parameter set with associated configuration parameter values, wherein each of the configuration parameter sets may comprise a first subset of configuration parameters, wherein first subset configuration parameter values may be equal to the first subset configuration parameter values of the other computing systems, and wherein each of the configuration parameter sets may comprise a second subset of configuration parameters, having second subset configuration parameter values, which may be different to the second subset configuration parameter values of the other computing systems. The parameter management engine may comprise:

a first storing unit adapted for storing in a database the configuration parameter sets along with respective configuration parameter values for each of the computing systems, a second storing unit adapted for storing in the database the first subset of configuration parameters and respective first subset configuration parameter values, a third storing unit adapted for storing in the database the second subset of configuration parameters, a fourth storing unit adapted for storing a definition of rules for changing configuration parameter values in each configuration parameter set, a fifth storing unit adapted for storing in the database a definition of rules for mapping configuration parameters and their values between second subsets of configuration parameters for the different computing systems, a generating unit adapted for generating service instances of computing systems according to the configuration parameter sets and the corresponding configuration parameter values, a determining unit adapted for determining configuration parameter value changes in the configuration parameter sets for each generated service instance of computing systems, a comparing unit adapted for comparing the configuration parameter value changes for each generated service instance with the first subset configuration parameter values and with the second subset configuration parameter values, a propagating unit adapted for propagating determined configuration parameter value changes in one service instance to the other service instances according to the rules for mapping configuration parameters between second subsets of configuration parameters.

It should be noted that the method for automatic management of configuration parameters may be implemented as part of a systems management or services management tool that may be executed on a management server system as it is known by a skilled person. It should also be noted that computing resources should be understood as computers, networks, storage, software and a combination thereof as detailed below. The mentioned rules may be derived from policies, e.g. enterprise computing policies, e.g. for Cloud Computing environments.

BRIEF DESCRIPTION OF THE SEVERAL VIEWS OF THE DRAWINGS

Preferred embodiments of the invention will now be described, by way of example only, and with reference to the following drawings.

DETAILED DESCRIPTION

Figure 1:
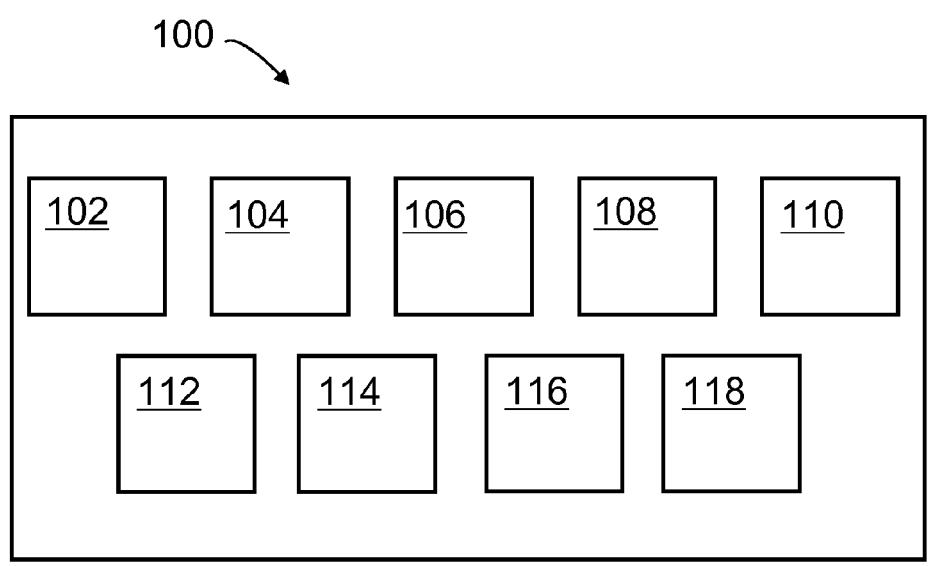
FIG. 1 shows a block diagram of an embodiment of the inventive method for automatic management of configuration parameters.

Additionally, there may be a third subset of configuration parameters that is only relevant in the context of each computing system and independent of the configuration parameters of the other computing systems.

The rules for mapping configuration parameters stored in the database may be explained further by the following: If the computing systems are used in, e.g., three stages for development, testing, and production, wherein two stages may be sufficient, but also more stages may be optional, and if the computing systems may have different hardware platforms (e.g. CISC vs. RISC), they may require different operating systems (e.g. Windows vs. AIX vs. zOS), then a parameter dedicated to an operating system of the computing environment may be different, not to say, has to be different. Other parameters may be directed to an attachment of storage systems, network type and speed, etc. The rules may then define a mapping of configuration parameters from one computing environment to another computing environment. It may be a linear 1:n mapping or a complex mapping, e.g., a m:n mapping, that may involve several configuration parameters and their relationship to each other. The rules may also define what kind of changes to the configuration parameters are allowed, what kind of boundaries are given for a configuration parameter, which configuration parameters may need to stay unchanged, etc. It should be clear that not a one-to-one mapping of configuration parameters from one computing environment to another computing environment is the purpose of the rules.

It should also be noted that the generating of service instances may involve more than one service instance per configuration parameter set. In case of virtual machines, more than one development system may be generated or more than one test system may be generated. This may be useful because several teams work on different aspects of the development or the testing.

It should also be noted that the propagation may work in any direction between the computing systems and a related serve instance. It may also be the case that only a predetermined propagation direction may be defined. The propagation may also be delayed or subject to additional predefined rules that may not be stored in the database, as described above, but that may be part of a superset of rules ensuring consistency across all computing systems of the same kind within, e.g., an enterprise or parts of an enterprise.

In the context of this application, the following expression conventions have been followed:

Computing systems—A computing system may denote a set of computing resources. That may be a single computer with related software, e.g., a personal computer typically used for software development purposes. But, it may also well be a complex set-up of a plurality of computers like server systems, logical computer networks linked by physical networks, computing clusters, network attached storage, and so on. The first example of a single computer may be used for a software development, whereas a cluster system may be used for running the developed application for thousands of users nonstop.

The computing systems may be related to each other in the sense that they may be dedicated to a project. One or more systems may be used for development purposes, another system—or several systems—may be used for testing and integration purposes of the developed software applications (or simple, application), and again another system may be used to run the final tested application for a large number of users.

Computing systems as described above may also be known as information technology environments (IT environment).

Applications may be understood as complete executable software programs or as parts thereof, fulfilling only a part of a complete application. In this sense, an application may denote a web service or a service delivered as component of a Cloud Computing service environment.

Configuration—The term configuration may denote a set of configuration parameters defining physical and operating parameters of a computer or computing system. Simple configuration parameters may describe the model of the computer, the disk size, available memory capacity, software applications and versions thereof installed, etc. Configuration parameters dedicated to more complex relationships may describe architecture aspects of a more complex computing environment. This may include relationships between computing resources, like master/slave dependencies, cluster set-ups, database partition hierarchies, virtual machine dependencies, etc. The terms parameters and configuration parameters may be used interchangeably.

Service instance—A service instance may denote a concrete instance of an IT service, including all IT resources required for operating that service instance (e.g., servers, storage, networks, software, etc.). Service instances may be created based on service definitions, whereas service definitions may contain template information that prescribes which type of IT resources will be required when building up service instances, how these IT resources should be configured by template parameters, and what kind of relationships may have to be established between IT resources—all this information may be contained in a topology template defined by the service definition. Service Instances may typically be dedicated to specific users or user groups (e.g., a department) who then get exclusive access to that service instance.

Hierarchy levels of computing systems—The related computing systems may have a horizontal and a vertical relationship to each other. Computing systems on the same hierarchical level may for example be all development systems in a project or all test systems in a project. However, in a development project, a test system may be at a higher hierarchy level than a development system. And a production computing system may be again at a higher hierarchy level than a test computing system.

There may also be a notion of a downstream in a project. Such a downstream may denote a later stage in a software development project. Testing and related test computing systems may be downstream if compared to a development stage of a software development project. A production environment may be again more downstream if compared to a test environment.

The above-described method for automatic management of configuration parameters the associated parameter management engine may offer some advantages.

Parameters of computing systems that may not be copied from one system to another one, due to different computing system environments, may be managed automatically. E.g., if a software development project with the phases "development, testing and production" may be performed the three computing systems or related computing environments may be different. The development system may be a personal computer (PC) running a Windows or Linux operating system. The software may be developed to be executed in a Java Virtual Machine (JVM). Such JVMs are also available in other computing environments, e.g., a Unix operating system may require other hardware set-ups if compared to PCs. However, operating parameters to be set may be different in these diverse computing environments. Again other parameters may be required if a JVM is run in a mainframe environment, i.e., a mainframe computing environment like an IBM zSeries System.

In order to keep all related computing environments synchronized regarding the parameter setting, a method, as described above, may be performed. A manual process would not be able to achieve that because of complexity, speed of change and volume of parameters required to (properly define a computing environment. In particular, if virtual machines are involved in the computing environments, it becomes a requirement to manage the related configuration parameters automatically because a manual process is unfeasible. In particular, in cloud computing environments with self-service options for developers requesting a new service instance of a development environment, a manual management of the various service instances becomes impossible.

In one embodiment of the method, the method may also comprise propagating determined configuration parameter value changes in one service instance to the other service instances between first subsets of configuration parameters. This may also allow propagating changes in configuration parameters that have to be identical in all related computing systems. If, e.g., in functional or integration tests, a parameter may be changed due to performance constrains, the respective parameter will then be mandatory also for the other systems, e.g., a development system and a production system.

In another embodiment of the method, the method may also comprise approving the step of propagating determined configuration parameter value changes between second subsets of configuration parameters. The step of approving may be performed before a propagation is performed. This may ensure that a qualified check may be done before a new value may be propagated to the related computing systems or service instances. It may help to assure an overall integrity of the related computing systems.

In again another embodiment, the approving step may also include a comparison against a parameter superset. Such a parameter superset may be seen as a next level in a hierarchy of parameters. It may be set, e.g., enterprise wide for all project and all computing systems in an enterprise ensuring certain security of functional standards. Such a parameter superset may have values or ranges for dedicated computing system configurations or dedicated configuration parameter sets. A propagation of new parameter values—under the rules according to defined algorithms of the database—may only be performed if the values are not in conflict with the parameters or the ranges defined by the values of a parameter superset.

In yet another embodiment, the method may also comprise approving the step of propagating determined configuration parameter changes between first subsets of configuration parameters. A similar concept as in the case of values of the second subset of parameters may be enabled by such a conditional propagation step. Consistency between computing systems or service instances may be guaranteed this way. Also, a test against a parameter superset may be included in such an approval step. In case the approval may not be given, the propagation may not be performed.

In one embodiment, the method may additionally comprise that the step of propagating is only performed in a predefined time window. This may apply to both propagation options, for the case of the first subset of parameters as well as for the case of the second subset of parameters. An advantage of such an additional condition is in that productions computing systems may not be disturbed during normal operating hours. A propagation may only be allowed in predefined maintenance time windows.

One embodiment of the method may comprise that the computing systems comprise at least one out of the group consisting of a development computing system, test computing system, and a production computing system. As already explained above, the related computing systems may be organized as typical software development set-up comprising three stages: development, test, and production. However, several systems of the same kind may be used in such a set-up: e.g., two or more development computing systems, two or more test computing systems, etc. Several systems per stage may increase the productivity of a software development and deployment process.

Again another embodiment of the method may comprise, after determining or propagating configuration parameter value changes, storing new configuration parameter values in the database. Such a step may ensure that the latest parameter values of all related computing systems may be stored in the database of a server system. If the storing may be done after the propagation it may ensure that a check against the rules has already been performed and that the new parameter values are valid.

One special feature of the method may be that the rules for mapping may comprise to only increase a memory size of a virtual machine. This may exclude the option to decrease a memory size of a virtual machine as one of the related computing systems or instantiated services. It may reflect a working habit in a software development process.

Furthermore, a computer or computer system may comprise a parameter management engine, as described above, and referring to the method for automatic management of configuration parameters.

It should be noted that embodiments may take the form of an entire hardware implementation, an entire software embodiment or an embodiment containing both, hardware and software elements. In a preferred embodiment, the invention is implemented in software which includes, but is not limited to, firmware, resident software and microcode.

In one embodiment, a data processing program for execution in a data processing system is provided comprising software code portions for performing the method, as described above, when the program is run on a data processing system. The data processing system may be a computer or computer system.

Furthermore, embodiments may take the form of a computer program product, accessible from a computer-usable or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

It should also be noted that embodiments of the invention have been described with reference to different subject-matters. In particular, some embodiments have been described with reference to method type claims whereas other embodiments have been described with reference to apparatus type claims. However, a person skilled in the art with gather from the above and the following description that, unless otherwise notified, in addition to any combination of features belonging to one type of subject-matter, also any combination between features relating to different subject-matters, in particular between features of the method type claims, and features of the apparatus type claims, is considered as to be disclosed within this document.

The aspects defined above and further aspects of the present invention are apparent from the examples of embodiments to be described hereinafter and are explained with reference to the examples of embodiments, but to which the invention is not limited.

In the following, a detailed description of the figures will be given. All illustrations in the figures are schematic. Firstly, a block diagram of the inventive method for automatic management of configuration parameters will be described. Afterwards, embodiments of a method and a parameter management engine will be described.

FIG. 1 shows a block diagram of an embodiment of the inventive method 100 for automatic management of configuration parameters.

Each of the configuration parameter sets may comprise a first subset of configuration parameters, wherein first subset configuration parameter values are equal to those of the other computing systems, and each of the configuration parameter sets may comprise a second subset of configuration parameters, having second subset configuration parameter values, which may be different to those of the other computing systems. The method may comprise:

Block 102 may illustrate storing in a database configuration parameter sets along with respective configuration parameter values for each of the computing systems. The configuration parameter sets may define each a configuration of related computing systems.

Block 104 may illustrate storing in the database a first subset of configuration parameters and respective first subset configuration parameter values. The configuration parameters of the first subset are common to all related computing systems and may have the same values.

Block 106 may show storing in the database the second subset of configuration parameters. These configuration parameters may be different between the related computing systems. One system may be an Intel based system, while another system may be a RISC (reduced instruction set computer) based or a mainframe based system. Consequently, these computing systems may have a set of parameters that are different. Values may not be comparable.

Block 108 may show storing a definition of rules for changing configuration parameter values in each configuration parameter set. This may mean that certain parameters may be changed in every computing system, but others may not be changed at all. Again others may be changed within certain predefined boundaries or ranges.

Block 110 may illustrate storing in the database a definition of rules for mapping configuration parameters and their values between second subsets of configuration parameters for the different computing systems. Because the parameters may vary from computing system to computing system, it may be required to define rules for mapping corresponding configuration parameters and values to each other in order to manage changes in one computing system as well as in others. An example may be a memory size in a JVM. A JVM memory size in a Windows machine may differ to the requirements for a memory size in a JVM in a Unix machine. It may also be the case that the memory size of a JVM may only be increased, but may never be decreased, which may define another rule.

Block 112 may then illustrate generating of service instances of computing systems according to the configuration parameter sets and the corresponding configuration parameter values. In this step, virtual machines may be set up to be used. The generation may be performed completely automatically.

If during development of software or during a test process it turns out that configuration parameters may be changed, it may be required to determine, block 114, changes of the configuration parameter values in the configuration parameter sets for each generated service instance of computing systems.

If it turns out that changes of parameter values may have happened, it may be required to compare, block 116, the configuration parameter value changes for each generated service instance with the first subset configuration parameter values and with the second subset configuration parameter values. This comparison may result in differences in parameter values if compared to the first or second subset of configuration parameters of a computing system.

If such changes may occur, the related new values of the parameters or alternative the value changes may be propagated, block 118, to the other computing systems or the other service instances, respectively. Such propagation may be done according to the rules for mapping configuration parameters between second subsets of configuration parameters. I.e., not a one to one copying may be done, but it may be determined, which rules to apply and to propagate, from a central management server, appropriate new parameters to the service instances or the other computer systems. An approval step—before propagating may ensure that only those changes are propagated that follow predefined rules or those that are managed as exceptional cases. Before propagating it may be required that the parameter changes may be sent to or received by the management server.

It may also well be that the propagation may only be performed according to a predefined time window, e.g., a service time window. In particular, production computing systems may only receive configuration parameter changes in certain time intervals.

Figure 2:
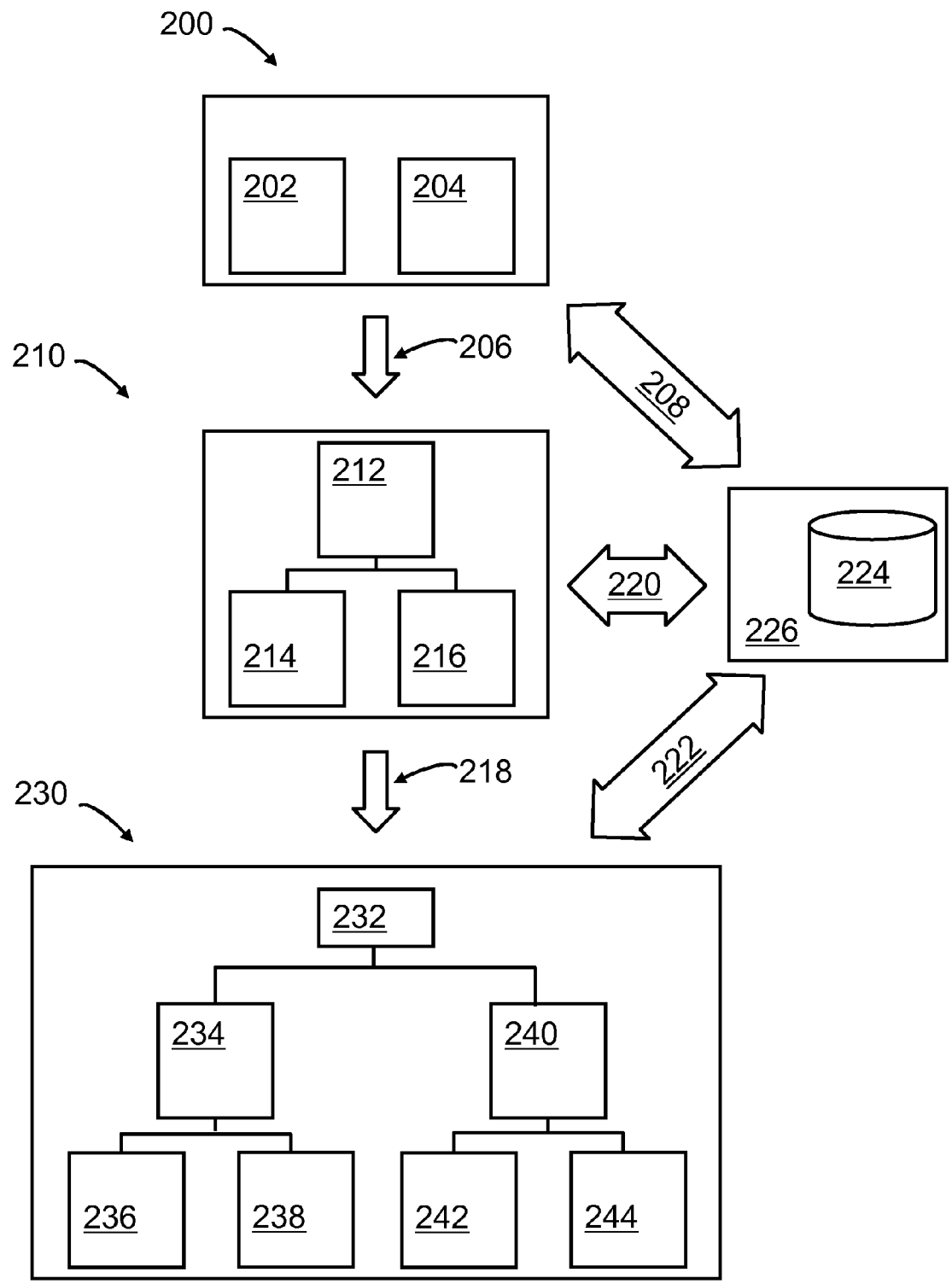
FIG. 2 shows a schematic relationship between related computing systems.

FIG. 2 may illustrate a schematic relationship between related computing systems. In a software development project there may be three hierarchies: a development computing system 200 at the lowest hierarchy level, a testing computing system 210 at a higher level, and a production computing system 230 at the highest level. The computing system may have an increased complexity in terms of computing capabilities. Though, they may also be equivalent. FIG. 2 shows that the development computing system 200 has two computing resources 202 and 204. That may be either two linked computer systems or just one computer system with a dedicated storage device. More than one computing system 200 may be available on the development level. More than one developer may develop different components of software applications in parallel. Parameters of the configuration of computing system 200 may be stored in the database 224 on the server system 226, e.g., an automatic management server. This is indicated by arrow 208.

Testing system 210 may comprise three computing resources 212, 214, and 216. Also the configuration parameters of the testing system 210 may be stored in the database 224 as indicated by arrow 220. There may be several test systems 210 in parallel for different test tasks within the software development project. However, the testing systems are not limited to the topology given as an example. Any suitable topology may be used. The same may apply to the production systems and the development systems.

The same applies again to a production computing system or production computing environment 230. This production computing environment may have a complex set-up in order to serve a plurality of users. E.g., two clusters 234, 236, and 238 and 240, 242, and 244 of computing resources may be used. They may be coordinated by a cluster controller 232. All configurations, including architecture parameters, may be stored in the database 224 on the server system 226 as indicated by arrow 222.

All three or only parts of the computing environments—development, testing and production—may be implemented as virtual machines. In this case, different configuration parameter sets in the database 224 may be used for generating each service instances in the form of a virtual machine. Clearly, a physical computing system as a basis for a virtual machine may be required.

The arrows 206 and 218 may indicate that configuration parameters may be propagated from one computing system, e.g., 200 or 210, to another computing system, e.g., 210 or 230. However, the physical transfer of parameters may need the involvement of the server 226 and a related parameter management engine as well as the database 224. In any case, it should be noted that the invention may only require two hierarchy levels of computing systems or computing environments. A series of three hierarchy levels of systems may be optional as also more than three hierarchy levels may be possible.

Figure 3:
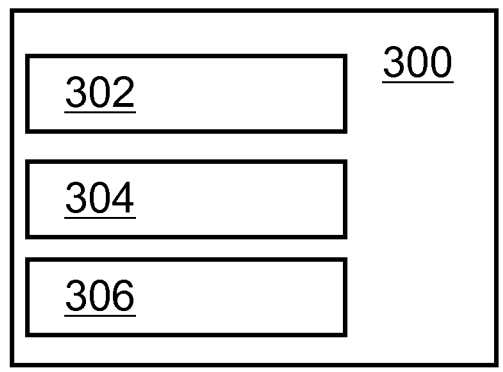
FIG. 3 shows an embodiment of different sets of parameters suitable for running related computing environments.

FIG. 3 may illustrate different sorts of configuration parameters. Each of the related computing systems may each require a configuration parameter set 300. This may either be a set of configuration parameters for a physical machine or a virtual machine. The set of configuration parameters may be split in 3 groups 302, 304, and 306. The first group 302 may comprise all parameters that need to be identical for all related computing environments, e.g., class loader rules for the JVMs, in particular, a sequence of using the class loaders, a configuration of a portal finder service, or language settings of a portal presentation layer.

A second group of parameters 304 may comprise parameters that may have different values between the related computing systems or service instances. Thus, a simple direct copy from one computing system or environment to another different computing system or environment is no longer possible. An intelligent mapping involving individual rules may be required.

A third group of parameters 306 in a configuration parameter set may be irrelevant when looking at the different related computing environments. Also these configuration parameters may be essential when defining a computing environment, e.g., a physical or virtual machine.

Figure 4:
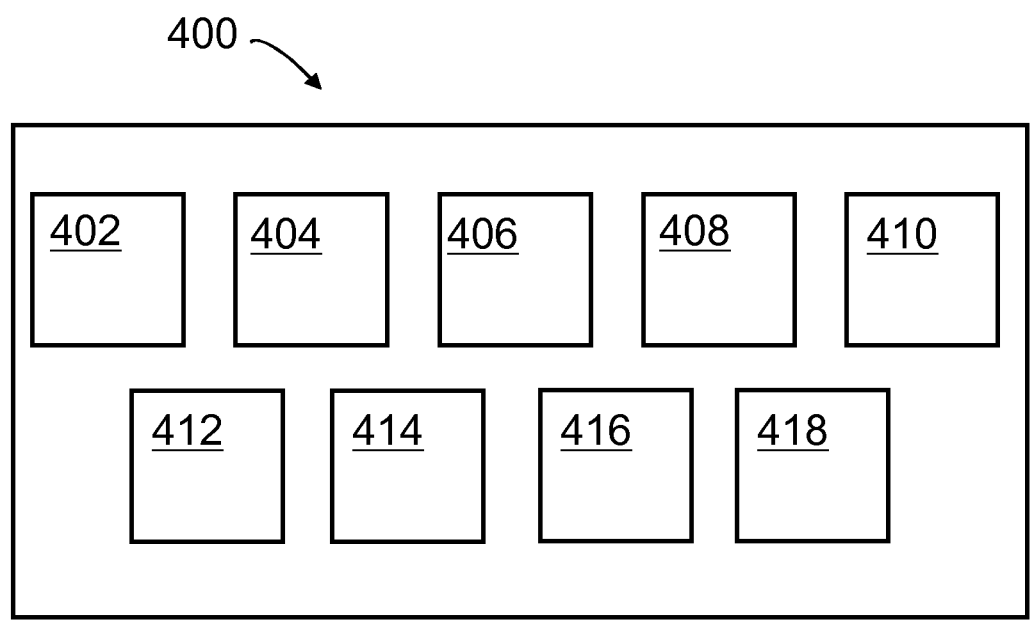
FIG. 4 shows block diagram of an embodiment of the inventive parameter management engine.

FIG. 4 shows a block diagram of an embodiment of the inventive parameter management engine. A parameter management engine 400 for automatic management of configuration parameters of computing resources between related computing systems in an automatic management server is shown. Each of the computing systems may be configured according to a configuration comprising a configuration parameter set with associated configuration parameter values, and each of the configuration parameter sets may comprise a first subset of configuration parameters, wherein first subset configuration parameter values may be equal to the first subset configuration parameter values of the other computing systems. Each of the configuration parameter sets may comprise a second subset of configuration parameters, wherein second subset configuration parameter values may be different to the second subset configuration parameter values of other computing systems. The parameter management engine may comprise: A first storing unit 402 may be adapted for storing in a database the configuration parameter sets along with respective configuration parameter values for each of the computing systems. A second storing unit 404 may be adapted for storing in the database the first subset of configuration parameters and respective first subset configuration parameter values. A third storing unit 406 may be adapted for storing in the database the second subset of configuration parameters. A fourth storing unit 408 may be adapted for storing a definition of rules for changing configuration parameter values in each configuration parameter set. Additionally, a fifth storing unit 410 may be adapted for storing in the database a definition of rules for mapping configuration parameters and their values between second subsets of configuration parameters for the different computing systems.

Moreover, a generating unit 412 may be adapted for generating service instances of computing systems according to the configuration parameter sets and the corresponding configuration parameter values, and a determining unit 414 may be adapted for determining configuration parameter value changes in the configuration parameter sets for each generated service instance of computing systems.

A comparing unit 416 may be adapted for comparing the configuration parameter value changes for each generated service instance with the first subset configuration parameter values and with the second subset configuration parameter values.

It should be noted that configuration parameter values may be changed manually during the development or the testing phase of a software development project. Seldom but nevertheless possible, is it to change the configuration parameter values of a production computing system.

Additionally, a propagating unit 418 may be adapted for propagating determined configuration parameter value changes in one service instance to the other service instances according to the rules for mapping configuration parameters between second subsets of configuration parameters.

Figure 6:
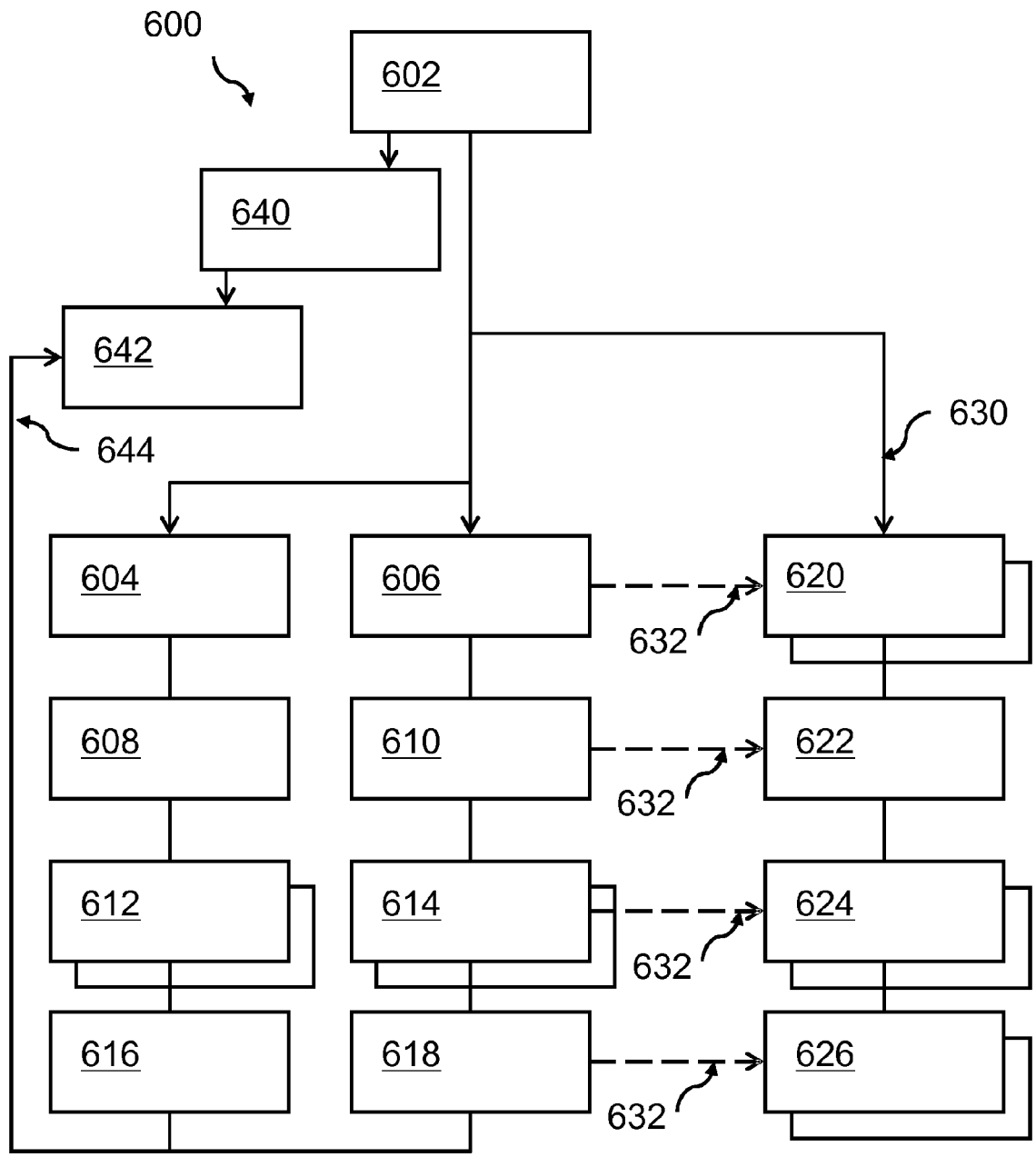
FIG. 6 shows a management flow or objects according to an embodiment of the invention.

FIG. 6 shows a management flow 600 or objects according to an embodiment of the invention. In an overall service project 602 an overall configuration 602 may be provided. From the configuration 602 a service definition 604 for a development system and a service definition 606 for a test system may be derived. The service definitions 604, 606 may each comprise a topology template 608, 610, which may comprise zero to many node templates 612, 614 having zero to many node attributes 616, 618. A node attribute 616, 618 of a node template 612, 614 may have a name and a type, e.g., a hostname of a server, and a template value which may be used as default when creating instances of a node.

Linked to the node attributes 616, 618 may also be a parameter handling definition 640 that may define a policy (see below) for managing respective parameters in the context of the containing service project with the overall configuration 602, e.g., how a Java Heap Size parameter of an application server should be managed. The policy of the parameter handling definition 640 may be designed like this:

| policy | approval | tracking |
| --- | --- | --- |
| (fixed) | | |
| (derived) | | |
| local | — | — |
| change_with approval | X | — |
| Change with approval, tracked | X | X |

The parameter handling definition 640 may comprise a governance level, e.g., on the service definition level, a project definition level, or on an enterprise level. Parameter mapping rules 642 may be linked to the parameter handling definition 640—as indicated by line 644—and to the node attribute 616, 618. The parameter mapping rule 642 may have the following form:

| parameter mapping | required rule | ruleID |
| --- | --- | --- |
| | yes/no | rule xyz |

A respective rule—here rule xyz—may define how to map parameters in different service definitions 604, 606.

A monitoring component may constantly scan all deployed service instances 620 (or their components and parameters, respectively) in a pre-defined time interval, e.g., every 10 minutes or in any other time interval. The service instances 620—there may be more than one—follow the same logic of topology parameters 622, node parameters, 624, and node attribute parameters 626 as described above and indicated by the solid arrow line 630 and the dashed lines 632.

If any change in a configuration parameter may be detected by the monitoring component, the parameter handling definition 640, attached to the respective node attribute of the original node template 612, 614 in the service definition 604, 606 from which a service instance 620 may have been created, may be checked. According to the policy denoted in the parameter handling definition 640, the following actions may be performed:

Policy "Fixed": This policy may indicate that the related parameter may not be changed. Therefore, a change of the parameter may have violated the policy. The system may try to reset the parameter to the original value. If this may be not possible, an alert may be raised.

Policy "Derived": This policy may indicate that the parameter may be derived from the original parameter in the service definition based on specific rules, e.g., naming rules that may include a name of the service instance, server, etc. If the newly detected value of the parameter may violate that rule, the systems may try to reset the parameter to a value according to the rule. If this may not be possible, an alert may be raised.

Policy "Local": This policy may indicate that a parameter may be freely set for any specific instance of a system. No action may be to be taken.

Policy "Change with Approval": This policy may indicate that a parameter in any system may only be changed if this is approved at the correct authority level as indicated in the governance level attribute of the parameter handling definition 640 of the original node attribute in the original service definition 604, 606, an instance 620 has been created from. If a changed parameter may be detected, a policy violation may be recorded and the complete service instance, e.g., a specific computing environment consisting of a server, application, server middleware and a database may be marked in-compliant to the service definition and service project policies. The violation record may contain at least the following attributes: time of violation detection, original value, new value.

This violation record may then be sent up a tree of authoritative definitions to handle the violation at the correct authority level. For example, if the authority level of a specific parameter may be at the service definition level—meaning that all instances created from a service definition 604, 606 should adhere to a policy for a specific parameter, but service instances 620 created from other service definitions may use other values for the same parameter—the owner of the service definition 604, 606 may have to approve the change (or an automatic rule which changes to approve and which changes to decline is stored in the system).

If the change may be approved, the violation record's state also may be changed to "approved" and the respective service instance 620 may use the new value for the parameter. Storing the approved violation record in the system may ensure that the history of changes and any approval history may be available at any later point in time.

If the change may be declined, the respective service instance 620 may still violate the service project policies and the system may try to reset the parameter to its original value.

Policy "Change with Approval, Tracked": This policy may be quite similar to the previous policy, but an additional mechanism may ensure that all systems in a service project, or in a specific context according to the authority level at which a parameter may be tracked, may be configured equally.

Again, if a parameter change may be detected, a violation record may be created which marks the respective system as in-compliant. This violation record may then be sent up the hierarchy tree until it may reach the authority level as indicated in the governance level attribute of the parameter handling definition 640 attached to the node attribute in the original service definition.

At the respective authority level, it may be decided whether or not the detected parameter change should be accepted, e.g., (done by a human operator or based on automatic rules stored in the system). This decision may be done based on the original parameter value and the new parameter value stored in the violation record.

If the changed may be declined, the service instance 620, where the change may have been detected, may still be incompliant and the system may try to set the original parameter value again.

If the change may be approved, however, the original node attribute or the node template 612, 614 in the service definition 604, 606 from which the service instance 620 may have been created may be updated to the new value, i.e. the parameter is "tracked". This may result in the fact that the service instance 620, where the parameter change may have been detected, may now be compliant to the service definition again, while all other service instances 620 may now be in-compliant. Thus, the system may now push the parameter change to all other service instances 620 making them compliant again. For example, this mechanism may ensure that a required parameter change that may have been detected, for example, in a test system, may appropriately be propagated to all systems ensuring correct execution of applications.

It should be noted that this tracking and propagation of parameter changes may be a recursive process that may be performed over multiple levels of authority in a service project or enterprise, depending on whether the governance level for a specific parameter may be defined at the service definition level, a project level, or an enterprise level (e.g. in many enterprise, specific naming or security rules may exist that should be adhered to by all systems in an enterprise).

The flow discussed above is concerned with a parameter, where the governance level may have been defined in a service definition. Thus, the parameter change may have been propagated to all service instances 620 created from that service definition 604, 606, i.e. all entities below the respective point in the authority hierarchy.

If the governance level may be defined, for example, at the project level, the flow may change as follows: The parameter violation record may be sent up the authority tree to the project level. If the parameter change may be approved, the definitive parameter value at the project level may be set to the new value as indicated in the violation record. This may be reflected in all service definitions 604, 606 within the project, i.e., the entities directly below the project entity in the authority tree being marked as violating the project policies. The system may now update all the service definitions 604, 606, i.e. the node attributes of their node templates 612, 614 to the new parameter value.

This in turn may result in all service instances 620 created from those service definition 604, 606 being marked as violating the parameter policies of their service definitions 604, 606—except for the service instance 620 where the parameter change may have been detected; this service instance 620 may now be compliant, since the project and service definition policies may have been updated. The system may now try to update the corresponding parameter values of all the non-compliant service instances 620 to make them compliant again. Consequently, the parameter change is propagated to all systems.

If the governance level of a parameter is defined at the enterprise level, the flow may change accordingly. That is, a change would be propagated to all projects in the enterprise, which in turn would propagate the change to all service definitions 604 606, and so on.

Figure 5:
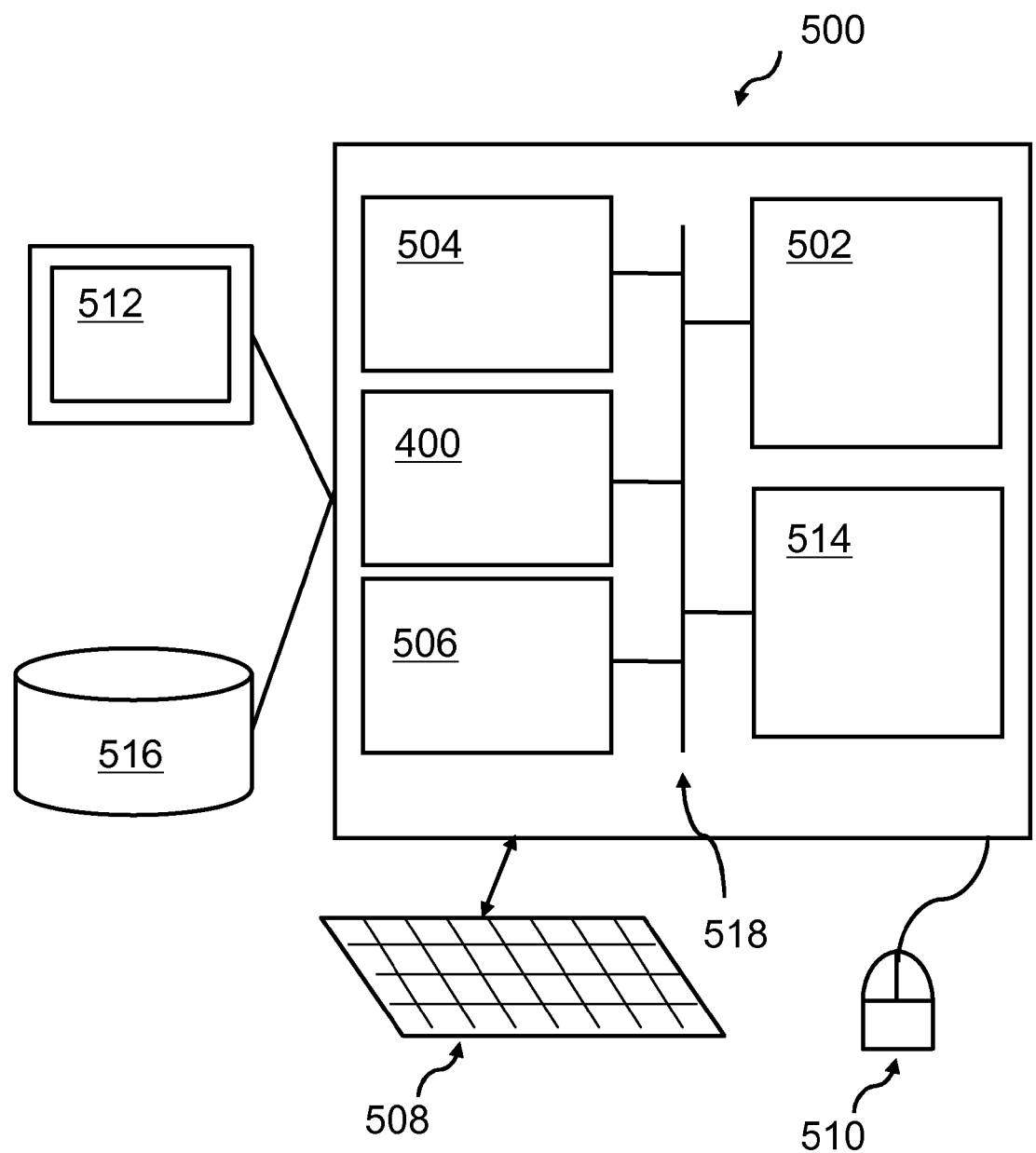
FIG. 5 shows a block diagram of an embodiment of a computer system with a parameter management engine.

Embodiments of the invention may be implemented on virtually any type of computer, regardless of the platform being used suitable for storing and/or executing program code. For example, as shown in FIG. 5, a computer system 500 may include one or more processor(s) 502 with one or more cores per processor, associated memory elements 504, an internal storage device 506 (e.g., a hard disk, an optical drive such as a compact disk drive or digital video disk (DVD) drive, a flash memory stick, etc.), and numerous other elements and functionalities typical of today's computers (not shown). The memory elements 504 may include a main memory, employed during actual execution of the program code, and a cache memory, which provides temporary storage of at least some program code or data in order to reduce the number of times, code must be retrieved from external bulk storage 516 for an execution. Elements inside the computer 500 may be linked together by means of a bus system 518 with corresponding adapters. Additionally, a parameter management engine 400 may be attached to the bus system 518.

The computer system 500 may also include input means, such as a keyboard 508, a mouse 510, or a microphone (not shown). Furthermore, the computer 500, may include output means, such as a monitor 512 [e.g., a liquid crystal display (LCD), a plasma display, a light emitting diode display (LED), or cathode ray tube (CRT) monitor]. The computer system 500 may be connected to a network (e.g., a local area network (LAN), a wide area network (WAN), such as the Internet or any other similar type of network, including wireless networks via a network interface connection 514. This may allow a coupling to other computer systems. Those, skilled in the art will appreciate that many different types of computer systems exist, and the aforementioned input and output means may take other forms. Generally speaking, the computer system 500 may include at least the minimal processing, input and/or output means, necessary to practice embodiments of the invention.

Further, those skilled in the art will appreciate that one or more elements of the aforementioned computer system 500 may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and/or resources or a smartphone.

Further, software instructions to perform embodiments of the invention may be stored on a computer readable medium, such as a compact disk (CD), a diskette, a tape, or any other computer readable storage device.

While the invention has been described with respect to a limited number of embodiments, those skilled in the art, having benefit of this disclosure, will appreciate that other embodiments can be devised, which do not depart from the scope of the invention as disclosed herein. Accordingly, the scope of the invention should be limited only by the attached claims.

It should also be noted that the term "comprising" does not exclude other elements or steps and "a" or "an" does not exclude a plurality. Also, elements described in association with different embodiments may be combined. It should also be noted that reference signs in the claims should not be construed as limiting elements.

The invention claimed is:

1. A computer system comprising:
a processor; and
a memory coupled to the processor, wherein the memory comprises instructions which, when executed by the processor, cause the processor to:
generate service instances of computing systems according to associated configuration parameter sets and respective corresponding configuration parameter values, determine configuration parameter value changes in the configuration parameter sets for each generated service instance of the computing systems, compare the configuration parameter value changes for each generated service instance with a first subset configuration parameter values and with a second subset configuration parameter values, and propagate the determined configuration parameter value changes in one service instance to another service instance according to a definition of rules for mapping configuration parameters and their values between second subsets of configuration parameters.

2. The computer system of claim 1, wherein the instructions further cause the processor to: propagate the determined configuration parameter value changes in one service instance to the other service instance between first subsets of configuration parameters.

3. The computer system of claim 2, wherein the instructions further cause the processor to: obtain approval before propagating the determined configuration parameter changes between the first subsets of configuration parameters.

4. The computer system of claim 1, wherein the instructions further cause the processor to: obtain approval before propagating the determined configuration parameter value changes between the second subsets of configuration parameters.

5. The computer system of claim 4, wherein the instructions to obtain the approval further causes the processor to provide a comparison against a parameter superset.

6. The computer system of claim 1, wherein the instructions to propagate the determined configuration parameter value changes is only performed in a predefined time window.

7. The computer system of claim 1, wherein the computing systems comprise at least one of a development computing system, test computing system, or a production computing system.

8. The computer system of claim 1, wherein the instructions further cause the processor to: after determining or propagating configuration parameter value changes, store new configuration parameter values in a database.

9. The computer system of claim 1, wherein the definition of rules for mapping configuration parameters and their values comprise m only increase a memory size of a virtual machine.

10. A computer program product comprising a non-transitory computer readable medium having a computer readable program stored therein, wherein the computer readable program, when executed on a computing device, causes the computing device to: generate service instances of computing systems according to associated configuration parameter sets and respective corresponding configuration parameter values determine configuration parameter value changes in the configuration parameter sets for each generated service instance of the computing systems, compare the configuration parameter value changes for each generated service instance with a first subset configuration parameter values and with a second subset configuration parameter values, and propagate the determined configuration parameter value changes in one service instance to another service instance according to a definition of rules for mapping configuration parameters and their values between second subsets of configuration parameters.

11. The computer program product of claim 10, wherein the computer readable program further causes the computing system to: propagate the determined configuration parameter value changes in one service instance to the other service instance between first subsets of configuration parameters.

12. The computer program product of claim 11, wherein the computer readable program further causes the computing system to: obtain approval before propagating the determined configuration parameter changes between the first subsets of configuration parameters.

13. The computer program product of claim 10, wherein the computer readable program further causes the computing system to: obtain approval before propagating the determined configuration parameter value changes between the second subsets of configuration parameters.

14. The computer program product of claim 13, wherein the computer readable program to obtain the approval further cause the computing system to provide a comparison against a parameter superset.

15. The computer program product of claim 10, wherein the computer readable program to propagate the determined configuration parameter value changes is only performed in a predefined time window.

16. The computer program product of claim 10, wherein the computing systems comprise at least one of a development computing system, test computing system, or a production computing system.

17. The computer program product of claim 10, wherein the computer readable program further causes the computing system to: after determining or propagating configuration parameter value changes, store new configuration parameter values in a database.

18. The computer program product of claim 10 wherein the definition of rules for reaping configuration part, meters and their values comprise to only increase a memory size of a virtual machine.

* * * * *